United States Patent [19]

Daviditz

[11] 3,976,598

[45] Aug. 24, 1976

[54] ZEOLITE SYNTHESIS

[75] Inventor: John C. Daviditz, Hopewell, N.J.

[73] Assignee: Mobil Oil Corporation, New York, N.Y.

[22] Filed: Mar. 29, 1974

[21] Appl. No.: 456,567

[52] U.S. Cl. .............................. 252/455 Z; 423/118; 423/328

[51] Int. Cl.² ..................... B01J 29/06; C01B 33/26

[58] Field of Search ................ 252/455 Z; 423/118, 423/328; 208/111

[56] References Cited
UNITED STATES PATENTS

| | | | |
|---|---|---|---|
| 3,114,603 | 12/1963 | Howell | 423/118 |
| 3,701,629 | 10/1972 | Maness | 423/329 |
| 3,702,886 | 11/1972 | Argauer et al. | 208/111 X |
| 3,855,147 | 12/1974 | Granquist | 423/328 X |

Primary Examiner—Carl F. Dees
Attorney, Agent, or Firm—Charles A. Huggett; Raymond W. Barclay

[57] ABSTRACT

Process for synthesizing crystalline aluminosilicates of the molecular sieve type wherein smectite which has undergone fusion with sodium chloride is employed as a source of silica and alumina.

8 Claims, No Drawings

ZEOLITE SYNTHESIS

BACKGROUND OF THE INVENTION

1. Field of the Invention

This invention relates to synthesis of crystalline aluminosilicates of the molecular sieve type utilizing a treated smectite as a source of silica and alumina.

2. Description of the Prior Art

It has heretofore been known to employ certain clays, principally those of the kaolin type, in synthesizing crystalline aluminosilicate zeolites as a result of treatment with caustic solution. Thus, U.S. Pat. No. 2,992,068 describes conversion of dehydrated kaolin clay by contact with a relatively concentrated caustic solution at low temperature into a type A zeolite. U.S. Pat. No. 3,414,602 describes conversion of calcined kaolin by reaction with sodium hydroxide and tetramethylammonium hydroxide to yield zeolite N. U.S. Pat. Nos. 3,515,681 and 3,515,682 describe techniques for transforming calcined kaolin into synthetic faujasite by alkaline aging in sodium hydroxide solution. U.S. Pat. No. 3,037,843 describes treatment of a variety of clay minerals, particularly of the kaolin type, with caustic solution to yield a crystalline sodium aluminosilicate which is then treated with an acid to yield a "permutitic acid" which upon treatment with dilute alkali solution at an elevated temperature yields a crystalline aluminosilicate of the molecular sieve type. U.S. Pat. No. 3,508,867 describes treatment of clays with sodium hydroxide or potassium hydroxide solution, preferably in admixture with a source of silica, followed by calcination at temperatures ranging from 230°F. to 1600°F. to yield a material which is crushed, dispersed in water and digested in the resulting alkaline solution to yield, upon crystallization, a crystalline aluminosilicate. U.S. Pat No. 3,119,660 describes preparation of a molecular sieve-type crystalline aluminosilicate by contacting kaolin with an aqueous alkaline solution containing a water-soluble alkali metal salt. After a suitable period of digestion, crystallization occurs.

As noted, the clays previously employed for molecular sieve crystalline aluminosilicate preparation have almost invariably been of the kaolin type. Such clays have the general molar composition $Al_2O_3 \cdot 2SiO_2 \cdot xH_2O$. The $SiO_2/Al_2O_3$ ratio may, however, vary from as low as 1.8 to as high as 2.6. The kaolin-type clays may be considered as sheet-like crystalline silicates. Their basic structural unit is an aluminosilicate sheet consisting of a layer of silicon cations in tetrahedral coordination with oxygen anions, bonded to a layer of aluminum cations in octahedral coordination with oxygen or hydroxyl anions. These sheets, of approximately 7 Angstroms thickness, are stacked one on top of another to form the small plate-like crystals of the mineral. Representative of kaolin-type clays which contain the above-described two-layer sheet structure are kaolinite, levisite, nacrite, dickite, endellite and halloysite. These clays differ only in the way the basic structural sheets are stacked.

Aside from the kaolin-type clays, there are large quantities of natural clay minerals of the smectite-type that have received essentially no attention as starting materials for zeolite synthesis. Those clays, also referred to as montmorillonite or bentonite-type, are composed of units made of two silica tetrahedral sheets with a central alumina-containing octahedral sheet. In the stacking of the silica-alumina containing silica units, oxygen layers of each unit are adjacent to oxygens of the neighboring units with a consequence that there is a very weak bond and an excellent cleavage between them. One of the outstanding features of such structure is that water and other polar molecules can enter between the unit layers causing the lattice to expand. These layers are 10 Angstroms thick compared to the 7 Angstroms layer thickness of the kaolin-type clays. The reason for the difference in plate thickness is the presence in the smectite type clays of the additional silicon tetrahedral sheet. The smectite type clays characteristically have a higher silica/alumina ratio than the kaolin-type clays.

The lack of attention accorded clays of the smectite type as sources of silica and alumina in crystalline aluminosilicate synthesis has been due, at least in part, to the high density and poor diffusion characteristics associated with these clays after calcination.

SUMMARY OF THE INVENTION

In accordance with the present invention, it has been found that smectite-type clays can be rendered useful as a source of silica and alumina in synthesis of crystalline aluminosilicate molecular sieve type zeolites by fusion with sodium chloride. It has further been found that the particular crystalline aluminosilicate zeolite obtained can be controlled by variation in the specific reaction mixture of cations and the temperature and manner of fusion. The technique described herein is especially applicable for synthesis of high silica/alumina ratio zeolites.

More particularly, the process of the present invention provides a method for employing smectite-type clays in the synthesis of crystalline aluminosilicate zeolites of the molecular sieve type by fusing such clay with sodium chloride at a temperature above the melting point of the latter but not exceeding its decomposition temperature. Generally fusion will be effected at a temperature within the approximate range of 500° to 1000°C. Without being limited by any theory, it is postulated that the sodium chloride functions as a flux for smectites at the high temperatures employed to make silica available and/or to bind alumina.

The resulting mixture, after cooling, is reacted with sources of desired cations. The smectite-clay serves as a source of silica and alumina. It is also within the purview of this invention to supplement the reaction mixture with additional sources of silica and alumina such as, for example, sodium aluminate, silica gel and sodium silicate, although it is a particular embodiment to employ the sodium chloride-fused smectite clay as the principal or sole source of silica and alumina.

Sources of cations present in the zeolite reaction mixture may vary widely depending on the crystalline aluminosilicate product sought. Zeolites produced in accordance with the process of the present invention includes synthetic faujasite, crystalline zeolites that are similar to the mineral, i.e. the molecular sieve type zeolites known as zeolite X, described in U.S. Pat. No. 2,882,244 and zeolite Y described in U.S. Pat. No. 3,130,007; also ZSM-5, described in U.S. Pat. No. 3,702,886 and zeolite B or P described in U.S. Pat. No. 3,008,803. **For synthesis of zeolite ZSM-5, the cation source present in the reaction mixture, along with the previously fused smectite-sodium chloride, is suitably sodium hydroxide and tetrapropylammonium bromide. For zeolite Y, the use of a reaction mixture containing a higher concentration of sodium hydroxide, as more particularly described hereinbelow, is employed.

In general, the composition of the reaction mixture from which the zeolite is crystallized will be those compositions heretofore specified for reaction mixtures of the particular zeolite desired. Thus, in the case of ZSM-5 the following compositions for the reaction mixture are as follows:

TABLE I

|  | Broad | Preferred | Particularly Preferred |
|---|---|---|---|
| OH /SiO$_2$ | 0.07–1.0 | 0.1–0.8 | 0.2–0.75 |
| R$_4$N$^+$/(R$_4$N$^+$ + Na$^+$) | 0.2–0.95 | 0.3–0.9 | 0.4–0.9 |
| H$_2$O/OH | 10–300 | 10–300 | 10–300 |
| SiO$_2$/Al$_2$O$_3$ | 5–100 | 10–60 | 10–40 | where R is propyl. For zeolite Y the reaction mixture desirably has a composition falling within one of the following ranges:

TABLE II

|  | Na$_2$O/SiO$_2$ | SiO$_2$/Al$_2$O$_3$ | H$_2$O/Na$_2$O |
|---|---|---|---|
| Range 1 | 0.20 to 0.40 | 10 to 40 | 25 to 60 |
| Range 2 | 0.41 to 0.60 | 10 to 30 | 20 to 60 |
| Range 3 | 0.61 to 0.80 | 7 to 30 | 20 to 60 |
| Range 4 | 0.6 to 1.0 | 8 to 30 | 12 to 90 |
| Range 5 | 1.5 to 1.7 | 10 to 30 | 20 to 90 |
| Range 6 | 1.9 to 2.1 | about 10 | 40 to 90 |
| Range 7 | 0.70 to 0.90 | 10 to 25 | 12 to 90 |
| Range 8 | 0.28 to 0.30 | 8 to 10 | 30 to 50 |

After formulation of the reaction mixture, the same is maintained at a temperature in the range of from about 20°C. to about 125°C. and preferably in the range of about 80° to about 125°C. until crystallization occurs. Crystallization from the reaction mixture may be controlled to yield conversion to the desired crystalline aluminosilicate zeolite. Alternatively, crystallization from the reaction mixture may be such as to yield a product which is an admixture of the previously fused smectite clay and the crystalline aluminosilicate molecular sieve type zeolite.

In one preferred embodiment, the synthesis of zeolites in varying proportion in intimate mixtures with the residium which constitutes an amorphous matrix derived from the smectite clay gives rise to a product characterized by excellent attrition resistance. The manner and degree fusion between the smectite clay and sodium chloride can be used to control the ratio between the amorphous matrix and crystalline aluminosilicate zeolite produced. For example, when 44 grams of smectite of composition: Fe 0.6%, Ca 0.03%, Mg 2.0%, Na 0.04%, SiO$_2$ 28.4%, Al$_2$O$_3$ 15.2%, Ash 92.7% are mixed with 10 grams NaCl and dried at room temperature, and the product placed into an oven at 800°C., and subsequently placed in a steam bath with 3 grams NaOH and 20 grams H$_2$O for a week at 80°C., then the product is 40% Y zeolite in an amorphous matrix remaining from the activated clay. On the other hand, if the same procedure as above is followed by omitting the NaCl, then the product is less than 10% Y zeolite in the remaining amorphous matrix.

The relative amounts of smectite clay and sodium chloride subjected to fusion temperatures will generally be present in a weight ratio of approximately 80 to 99.5 percent smectite to approximately 0.5 to 20 percent sodium chloride. After intimate admixture of the salt and smectite type clay, the same is exposed to fusion. The resulting fused mass is cooled and subsequently reacted with sources of the desired cations in aqueous medium to yield a reaction mixture of desired composition as exemplified by those described hereinabove.

The product obtained as a result of crystallization may, as indicated, be a substantially crystalline aluminosilicate or a mixture of amorphous residium derived from the clay and crystalline aluminosilicate. Catalytic properties have been found to be exceptional and unexpectedly active. Thus, a composite of ZSM-5 in the hydrogen form combined with a clay derived matrix is found to be several times more active in catalyzing hydrocarbons cracking than pure ZSM-5 in the hydrogen form prepared by the heretofore conventional techniques as described in U.S. Pat. No. 3,702,886.

DESCRIPTION OF SPECIFIC EMBODIMENTS

The following examples will serve to illustrate the method of the invention without limiting the same:

EXAMPLE 1

Calcium smectite having a surface area of 114 M$^2$/gram and the following composition was employed:

|  | Weight Percent |
|---|---|
| SiO$_2$ | 78.4 |
| Al$_2$O$_3$ | 15.2 |
| Na | 0.04 |
| Mg | 2.0 |
| Ca | 0.03 |
| Fe | 0.6 |
| Remainder | 3.73 |
| SiO$_2$/Al$_2$O$_3$ | 5.16 |
| Ash | 92.7 |

Forty-four (44) grams of this clay and sodium chloride (10 grams) were thoroughly mixed with sufficient water to dissolve the sodium chloride. This mixture was then dried at 300°C. and then heated to 800°–850°C. for approximately 1 hour, during which fusion occurred. The cooled product was slurried with 4 grams of sodium hydroxide and 10 grams of tetrapropylammonium bromide in 100 grams of water. The resulting product was refluxed for 2 weeks and then filtered. The product was in an easily filterable form. The presence of ZSM-5 type zeolite (30 percent) in combination with zeolite P was established by X-ray analysis.

EXAMPLE 2

The procedure of Example 1 was repeated employing, in place of calcium smectite, sodium smectite (sodium Wyoming bentonite) having a surface area of 80 M$^2$/gram and the following composition:

|  | Weight Percent |
|---|---|
| SiO$_2$ | 68.0 |
| Al$_2$O$_3$ | 21.4 |
| Na | .03 |
| Mg | 1.9 |
| Ca | .05 |
| Fe | 3.5 |
| Remainder | 5.12 |
| SiO$_2$/Al$_2$O$_3$ | 3.18 |
| Ash | 89.0 |

The product obtained, upon X-ray analysis, was found to contain ZSM-5 type zeolite (20 percent) in combination with zeolite P.

EXAMPLE 3

The procedure of Example 1 was repeated employing, in place of calcium smectite, Otay smectite having a surface area of 73 M²/gram and the following composition:

|  | Weight Percent |
|---|---|
| $SiO_2$ | 66.7 |
| $Al_2O_3$ | 12.6 |
| Na | 0.3 |
| Mg | 4.7 |
| Ca | 1.4 |
| Fe | 1.8 |
| Remainder | 12.5 |
| $SiO_2/Al_2O_3$ | 4.57 |
| Ash | 78.9 |

The product obtained, upon X-ray analysis, was found to contain zeolite P.

EXAMPLE 4

Twenty grams of calcium smectite, having the composition set forth in Example 1, were fused at 800°–850°C. for two hours with 5 grams of sodium chloride initially dissolved in a small amount of water. The resulting product, after cooling, was heated at 80°C. with 3 grams of sodium hydroxide and 5 grams of tetrapropylammonium bromide in 20 grams of water. The product, upon chemical and X-ray diffraction analyses, was established as zeolite Y (40 percent) having a silica/alumina ratio of approximately 4.5 contained in an amorphous matrix.

EXAMPLE 5

The procedure of Example 4 was repeated, but in the absence of sodium chloride. The product in this instance contained less than 5 percent of zeolite Y.

EXAMPLE 6

The procedure of Example 4 was repeated employing, in place of calcium smectite, Otay smectite having the composition set forth in Example 3.

The product obtained, upon X-ray analysis, was found to contain zeolite Y (less than 10 percent).

EXAMPLE 7

The procedure of Example 6 was repeated, but in the absence of sodium chloride. The product in this instance contained less than 5 percent of zeolite Y.

From the above examples, the desirability of initial fusing of the smectite clay with sodium chloride will be evident.

The product of Example 1 was tested for catalytic hydrocarbon conversion activity. Its activity, as determined by the alpha test, described in Superactive Crystalline Aluminosilicate Hydrocarbon Catalysis, P. B. Weisz et al., Journal of Catalysis, Vol. 4, No. 4, August, 1965, was 21,000 measured at 600°F. In carrying out this test a 14–30 mesh aliquot was tested for hexane-cracking activity by the α-test modified by feeding an equimolar mixture of n-hexane, 3-methylpentane, and 2,3 dimethylbutane at 1-LHSV, 20:1 $He/C_6$ ratio (3 seconds contact time). The results obtained are shown below:

| Temp. | Time min. | Alpha | Relative Rates |||
|---|---|---|---|---|---|
|  |  |  | $n-C_6$ | $3 MeC_5$ | $2,3Me_2C_4$ |
| 600°F. | 5 | 21,000 | 1 | 8.8 | 10.5 |
| " | 10 | 16,000 | 1 | 7.2 | 50 |
| " | 15 | 14,000 | 1 | 6.9 | 28 |
| " | 30 | 13,000 | 1 | 7.7 | 31 |
| 730° | 40 | 5,000 | 1 | 4.0 | 8.2 |
| " | 60 | 5,000 | 1 | 4.3 | 9.1 |
| " | 90 | 5,000 | 1 | 4.4 | 9.9 |

Interesting catalytic results have been obtained by utilizing the ZSM-5 zeolite produced by the technique of the present invention in hydrocarbon cracking. With such technique, it is feasible to produce ZSM-5 directly in a matrix since not all of the smectite during treatment necessarily undergoes conversion to zeolite. Utilizing the alpha test, referred to hereinabove, relative activities for various ZSM-5 samples were determined. Prior to conducting the alpha test, all samples were calcined for 1 hour in air at 1000°F. The results obtained are set forth below:

Hexane Cracking (Alpha Test)

| Catalyst | $SiO_2/Al_2O_3$ | Relative Activity of ZSM-5 |
|---|---|---|
| $NH_4ZSM-5$* | 72:1 | 1.0 |
| $NH_4ZSM-5$* | 35:1 | 3.3 |
| Clay Derived Matrix -ZSM-5 Obtained From Smectite (Product of Example 1) |  | 25.0 |

*Resulting from conventional synthesis method described in U.S. Pat. No. 3,702,886.

It will be seen from the above data that the product resulting from the method of the invention, wherein ZSM-5 obtained from smectite and contained in a matrix derived therefrom, was characterized by a substantially higher relative activity than pure HZSM-5 obtained by the conventional synthesis method.

I claim:

1. In a process for synthesizing a crystalline molecular sieve type aluminosilicate-containing product comprising zeolite Y or zeolite ZSM-5 by preparation of a reaction mixture containing, for zeolite Y, sodium oxide, silica, alumina and water and having a composition falling within one of the following ranges:

|  | $Na_2O/SiO_2$ | $SiO_2/Al_2O_3$ | $H_2O/Na_2O$ |
|---|---|---|---|
| Range 1 | 0.20 to 0.40 | 10 to 40 | 25 to 60 |
| Range 2 | 0.41 to 0.60 | 10 to 30 | 20 to 60 |
| Range 3 | 0.61 to 0.80 | 7 to 30 | 20 to 60 |
| Range 4 | 0.6 to 1.0 | 8 to 30 | 12 to 90 |
| Range 5 | 1.5 to 1.7 | 10 to 30 | 20 to 90 |
| Range 6 | 1.9 to 2.1 | about 10 | 40 to 90 |
| Range 7 | 0.70 to 0.90 | 10 to 25 | 12 to 90 |
| Range 8 | 0.28 to 0.30 | 8 to 10 | 30 to 50 | and, for zeolite ZSM-5, a tetrapropyl ammonium compound, sodium oxide, silica, alumina and water and having a composition falling within the following ranges:

|  | Broad | Preferred | Particularly Preferred |
|---|---|---|---|
| $OH^-/SiO_2$ | 0.07–1.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |

-continued

|  | Broad | Preferred | Particularly Preferred |
|---|---|---|---|
| $SiO_2/Al_2O_3$ | 5–100 | 10–60 | 10–40 | where R is propyl, maintaining the mixture at an elevated temperature until said product is formed, separating and recovering said product; the improvement which comprises utilizing as the principal source of silica and alumina in said reaction mixture a smectite clay which has undergone fusion with sodium chloride.

2. The process of claim 1 wherein the crystalline aluminosilicate molecular sieve type zeolite is zeolite Y.

3. The process of claim 1 wherein the crystalline aluminosilicate molecular sieve type zeolite is zeolite ZSM-5.

4. The process of claim 1 wherein the smectite clay and sodium chloride are present in a weight ratio of approximately 80 to 99.5 percent smectite clay and approximately 0.5 to 20 percent sodium chloride.

5. The process of claim 1 wherein said fusion is carried out at a temperature within the approximate range of 500° to 1000°C.

6. The process of claim 1 wherein the crystalline aluminosilicate molecular sieve type product is contained in a matrix derived from said smectite clay which has undergone said fusion.

7. The process of claim 1 wherein the crystalline aluminosilicate molecular sieve type product is zeolite Y contained in a matrix derived from said smectite clay which has undergone said fusion.

8. The process of claim 1 wherein the crystalline aluminosilicate product is zeolite ZSM-5 contained in a matrix derived from said smectite clay which has undergone said fusion.

* * * * *